Dec. 31, 1957 R. P. MITCHELL ET AL 2,817,920

FISHING LURE

Filed April 30, 1956

INVENTOR
RAYMOND P. MITCHELL
ZEN Z. SHORTER

BY *Fisher & Christen*

ATTORNEY

United States Patent Office 2,817,920
Patented Dec. 31, 1957

2,817,920
FISHING LURE
Raymond P. Mitchell and Zen Z. Shorter, Danville, Va.

Application April 30, 1956, Serial No. 581,684

1 Claim. (Cl. 43—26.2)

This invention relates to a fishing lure and more particularly to a fishing lure which is provided with an electric motor driven propeller and having rudder and elevator fins for determining the path of travel of said lure.

Fishing lures having propellers are known in the art but they are subject to several disadvantages. Normally no provision is made for determining the path of travel of the lure so that the lure usually moves in a straight line, and when it reaches the end of the fishing line it makes no more forward progress. Further, the propeller generally protrudes from the normal surface of the lure where it is subject to being damaged and where it detracts from the fish-like appearance which is intended to be designed into the lure.

These and other disadvantages are eliminated by the lure of the present invention. In accordance with the present invention the propeller is mounted on the front portion of a lure resembling a fish and adjustable fins are mounted on the rear portion of the lure. One fin member serves as a rudder whereas the other fin member serves as an elevator and stabilizer.

The forward portion of the lure housing is provided with a concavity within which the propeller blade is mounted. A foraminous screen covers the propeller blade and not only protects it from damage but additionally serves to retain the desired overall contour of the lure housing.

It is accordingly an object of the invention to provide a fishing lure in which the direction of the path of travel may be altered.

It is another object of the invention to provide a fishing lure driven by a propeller in which the propeller is mounted within a concavity formed in the outer surface of the lure housing.

It is another object of the invention to provide a fishing lure having transparent eye members with a light inside the lure to shine through said eye members.

These and other objects of the invention will become more readily apparent from the following detailed description of the invention taken in conjunction with the accompanying drawings in which.

Figure 1:
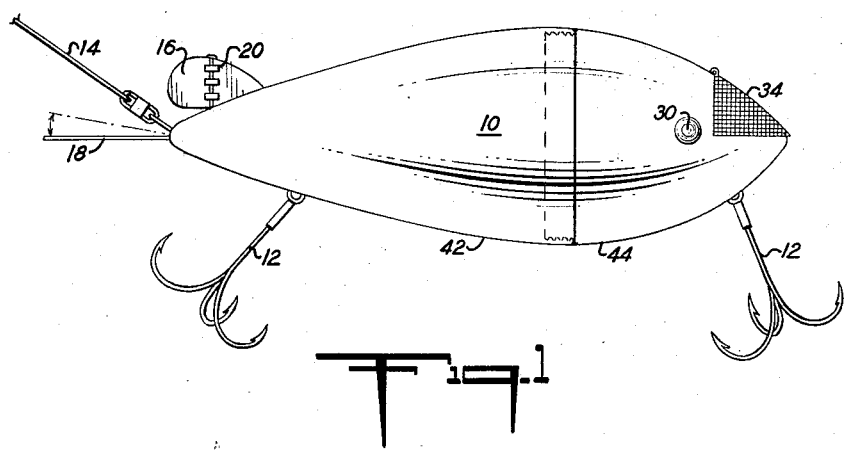
Fig. 1 is a side elevational view of the invention.
Figure 2:
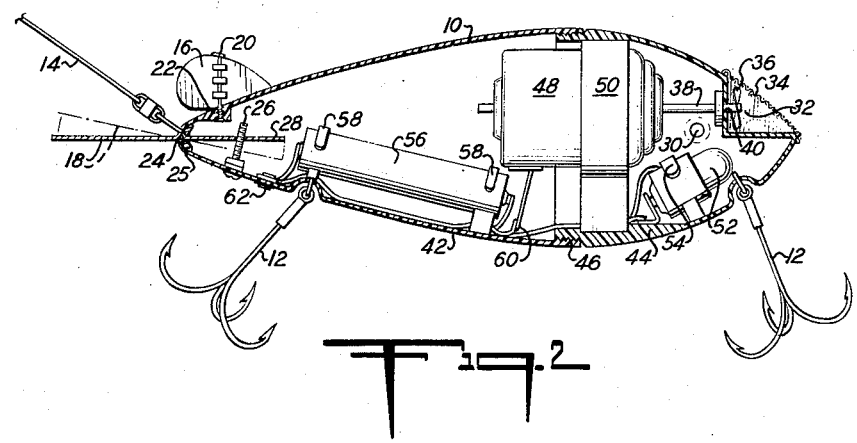
Fig. 2 is a cross sectional view through the center of the lure showing the operating members in elevation.
Figure 3:
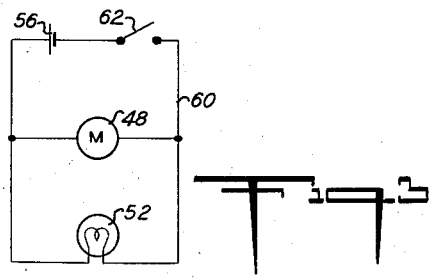
Fig. 3 is a circuit diagram of the electrical system.

Referring to the drawings, the lure consists of a housing 10 formed of a rearward portion 42 and a forward portion 44, which threadedly engage at 46 to form the housing which is generally in the shape of a fish. Attached to the housing 10 are hooks 12 and a fishing line 14. At the rearward portion of the lure are mounted a rudder fin 16 and an elevator fin 18. The rudder fin 16 is pivoted around a post 20 having a threaded engagement with the housing at 22. By tightening the post 20, the rudder fin 16 may be fixed in any selected position.

The elevator fin 18 is pivotally mounted at 24 to the housing. A neoprene gasket 25 prevents leakage through the pivotal mounting. An adjusting screw 26 threadedly engages an inward extension 28 of the elevator fin for adjusting the position of that fin.

The forward portion of the lure is provided with transparent beads 30 which form eyes in the lure through which light may shine.

The front portion is also provided with a concavity 32 which is covered by a foraminous screen 34. A propeller 36 rotates in the concavity 32 and is fixed to a shaft 38 which is journalled at 40 in the housing.

A small electric motor 48 is fixed by a bracket 50 in the forward portion 44 of the housing. Likewise a small light bulb 52 is mounted by means of a bracket 54 to the forward portion of the housing.

The motor and light bulb are energized by a dry cell battery 56 which is mounted in brackets 58 to the rear portion of the housing. Electrical conductors indicated generally at 60 connect the battery 56 to the motor 48 and light bulb 52. A switch 62 is connected in series with the battery so that the circuit may be energized or de-energized at the will of the operator.

It can be seen that the direction of rotation of the motor 48 and propeller 36 may be easily reversed by reversing the position of battery 56. Alternatively, a switch could be provided with a slight alteration in the circuitry which would reverse the polarity of the battery without requiring the physical shifting of the battery.

The operation of the invention should be readily apparent. Before the lure is placed in the water, the operator simply adjusts the rudder fin 16 to determine the arcuate path to be traveled by the lure and adjusts the elevator fin 18 to determine the descent of the lure into the water. These changes will, of course, be dependent upon the particular fish being sought and the environmental conditions such as the area in which the fishing is being done, the depth of the water and the temperature of the water.

The switch 62 is then turned to "on" position causing the light 52 to go on and the motor 48 to rotate the propeller 36. The rotation of the propeller 36 pulls the lure through the water in the direction determined by the setting of the fins 16 and 18. The light 52 shining through the eyes 30 of the lure attracts the lure to the fish. When a fish bites, the foraminous screen 34 protects the propeller so that the lure may be used again merely by dislodging it from the fish which it has caught.

In a general manner, while there has been disclosed in the above description, what is deemed to be the most practical, and efficient embodiment of the invention, it should be well understood that the invention is not limited to such embodiment as there might be changes made in the arrangement, disposition and form of the parts without departing from the principle of the present invention as comprehended within the scope of the accompanying claim.

We claim:

A fishing lure comprising, a housing, means forming a concavity in the external surface of the forward portion of said housing, a propeller rotatably mounted on said housing and located substantially wholly within said concavity a foraminous screen covering said concavity, a battery mounted in the rear portion of said housing and an electric motor mounted in the forward portion of said housing and connected to drive said propeller, and adjustable guide fins mounted on said housing for varying the direction of movement of said lure.

References Cited in the file of this patent

UNITED STATES PATENTS

| | | |
|---|---|---|
| 798,344 | Holz et al. | Aug. 29, 1905 |
| 798,836 | Sherbrook | Sept. 5, 1905 |
| 1,442,981 | Sherry | Jan. 23, 1923 |
| 1,446,816 | Taylor et al. | Feb. 27, 1923 |
| 1,850,296 | Vermeulen | Mar. 22, 1932 |
| 2,237,534 | Clute | Apr. 8, 1941 |
| 2,484,162 | Golembeski | Oct. 11, 1949 |
| 2,534,639 | Twist | Dec. 19, 1950 |
| 2,563,386 | Wight | Aug. 7, 1951 |
| 2,655,757 | Boyce | Oct. 20, 1953 |
| 2,726,471 | Uus | Dec. 13, 1955 |
| 2,740,220 | Caplan | Apr. 3, 1956 |
| 2,754,610 | Carlson | July 17, 1956 |